(12) United States Patent
Hrazdera

(10) Patent No.: US 6,619,451 B2
(45) Date of Patent: Sep. 16, 2003

(54) CONTROL SYSTEM FOR THE STARTING AND RUNNING-DOWN OF A POWER TAKE-OFF SHAFT ON AN AGRICULTURAL VEHICLE

(75) Inventor: Oliver Hrazdera, Enns (AT)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 10/179,679

(22) Filed: Jun. 25, 2002

(65) Prior Publication Data

US 2003/0024782 A1 Feb. 6, 2003

(51) Int. Cl.[7] .............................................. B16K 17/28
(52) U.S. Cl. .................. 192/3.58; 192/3.62; 192/103 C
(58) Field of Search ............................... 192/3.58, 3.62, 192/82 T, 99 R, 103 C, 109 F

(56) References Cited

U.S. PATENT DOCUMENTS

| | | | | |
|---|---|---|---|---|
| 4,109,772 A | * | 8/1978 | Poore | 477/31 |
| 4,263,997 A | * | 4/1981 | Poore | 192/103 R |
| 5,542,306 A | * | 8/1996 | Fernandez | 74/15.86 |
| 6,112,870 A | * | 9/2000 | Fukumoto | 192/3.58 |
| 6,199,653 B1 | * | 3/2001 | Matsufuji et al. | 180/233 |
| 6,269,927 B1 | * | 8/2001 | Kanenobu et al. | 192/87.18 |
| 6,537,177 B2 | * | 3/2003 | Degroot et al. | 477/75 |
| 6,581,744 | * | 6/2003 | Matsufuji | 192/87.15 |

FOREIGN PATENT DOCUMENTS

JP 5-106647 A * 4/1993

* cited by examiner

Primary Examiner—Saul Rodriguez
(74) Attorney, Agent, or Firm—John William Stader; Rebecca L. Henkel

(57) ABSTRACT

A control system is utilized for the starting and running-down of a PTO shaft on an agricultural vehicle, such as a tractor. The hydraulically actuated clutch, as well as the other parts and sub-assemblies connected with the clutch as part of the drive, attain a maximum service life under all conditions of use. The control system, both in normal operating mode and also in management operating mode, protects the cardan shaft against destruction through too great an angle of flexion. Finally, in the management mode of operation, the control system prevents the occurrence of a loss of time, which would reduce the effective time of use of the tractor with the tool in question, and renders impossible a stalling of the engine when starting the PTO shaft through too early ground contact of the tool, in which the PTO shaft is not yet turning.

18 Claims, 2 Drawing Sheets

CONTROL SYSTEM FOR THE STARTING AND RUNNING-DOWN OF A POWER TAKE-OFF SHAFT ON AN AGRICULTURAL VEHICLE

BACKGROUND OF THE INVENTION

The present invention relates to power take-off shafts on tractors, and, more particularly, to a control system for the starting and running down of a power take-off shaft on a tractor.

Such control systems vary the quantity and hence the pressure build-up and pressure decay respectively in the hydraulic fluid supplied to a hydraulically actuated clutch. For this the said hydraulically actuated clutch of whatever kind required is located in the drive train on a shaft between the engine and the power take-off shaft (PTO shaft) of the tractor, onto one end of which a cardan shaft is attached and its other end is connected to the PTO shaft of a tool suspended on the lift of the tractor so that it can be driven.

For such control systems a number of variant versions are already known, one of which is explained in more detail in WO 99/56978 A1. There a control device is fixed on the tractor, which contains a processor, which depending upon the input signals fed to it runs a special control program and produces appropriate output signals. In so-called normal operation mode the input signals come each from one push-button for switching on and off the PTO shaft and from a sensor for monitoring the speed of the PTO shaft. The operator can optionally switch over to a so-called management operation mode, where further input signals are fed to the controller via a push-button for switching on management operation mode, and via sensors for monitoring the speed of the rear axle and the status of the lift (controlling and transport).

The said output signals are passed on to a solenoid valve functioning as a switching valve, which in this case is a pulse-width-modulated ON/OFF valve. This solenoid valve admits the adjacent pressure of the hydraulic fluid from the hydraulic circuit of the tractor to the hydraulically actuated clutch, so that according to the special control program of the control device this engages and disengages smoothly over a specified period of time. One part of the input signals ensures the trouble free course of these functions and another part in management operation controls automatically in addition the engagement and disengagement of the hydraulically actuated clutch in according to the status of the lift of the tractor and its speed of travel, in which additional safety circuits are installed for the protection of the operator.

A disadvantage of this control system is that since it was conceived for optimum engagement and disengagement, which means engagement as fast and smoothly as possible for the avoidance of wear and tear on the hydraulically actuated clutch and the transmission of high torques harmlessly to the clutch, important conditions of use were not taken into account. On the one hand these include changes in viscosity of the hydraulic fluid through varying ambient temperatures. On the other hand through the special control program in the control device, on the clutch no influences are felt when at the moment of starting up very different tools are employed. Likewise the initial speed of the engine is not taken account of in the control program at the moment of starting or stopping of the PTO shaft, although it is known that in consequence of differing amounts of power being taken from the engine it can fluctuate markedly. Finally, a further disadvantage is seen in this control system in that no facility for variable manual setting for the smoothness of engagement and disengagement is envisaged. Therefore in this variant it is a question of a quite normal control, which cannot by a long way react so variably as a control system.

All the said disadvantages are the reason that a hydraulically actuated clutch controlled in such a way under these conditions has only a limited service life, since starting proceeds too abruptly. Furthermore, it is still to be criticised in this control that in management mode of operation engagement and disengagement of the hydraulically actuated clutch is not influenced by the desired height of lift of the tool, which, however, would certainly be desirable in view of the variability in the tools employed. As a result damage to the cardan shaft can sometimes occur, if this is not stopped in time before the attainment of a high angle of flexion when the lift is raised, or if already in the presence of a high angle of flexion it is switched on again too soon. If on the other hand in the reverse case, the cardan shaft is not switched on again in good time when the lift is lowered, loss of time occurs, which reduces the effective time of use of the tractor and with it the danger exists that in the event that the engine stalls, because the tool is already in contact with the ground before the PTO shaft starts turning.

A further variant implementation of a control system for starting and running-down a PTO shaft on a tractor has been disclosed in EP 0 443 325 A1, the main objective of which for the hydraulically actuated clutch and for critical operating conditions in the subsequent driving elements up to the tool, consists in avoiding increased wear and in the extreme case destruction of all the drive elements. The construction of this control system, which also works only as a control, agrees fully with the solution described in the foregoing, as it likewise possesses a controller which receives input signals and produces output signals, in which the output signals are passed on to a solenoid valve functioning as a switching valve for the engagement or disengagement of the magnetically actuated clutch in the drive train to the cardan shaft.

In a preferred implementation the solenoid valve is a proportional valve, which is driven by timed pulses from the control unit and thereby actuated. As input signal first the engine speed is monitored, in which the hydraulically actuated clutch is disengaged by the control unit when the engine speed falls below a set value and is reengaged when this value is exceeded. As a further input signal the speed of the input shaft and of the output shaft of the hydraulically actuated clutch is detected with sensors, from which the controller calculates the existing slip from the differences that occur. If this exceeds a set value, then the hydraulically actuated clutch is disengaged and when it falls below this value it is engaged again. In the same way the speed fluctuations on the input shaft and the output shaft of the hydraulically actuated clutch are processed as input signals. Finally the height of the lift on the tractor is followed and when a set limiting value is attained the clutch is disengaged.

For the purpose of engagement that is as rapid and smooth as possible, yet another characteristic curve is stored in the controller, the function of which is comparable with the control program from the controller in accordance with WO 99/56978 A1. As regards the disadvantages of this controller, to avoid a recapitulation of the disadvantages of the controller first described one is referred to these, as these are identical. A further disadvantage is added for this controller, as it does not provide for management operation mode.

SUMMARY OF THE INVENTION

For that reason the objective of the invention is based upon a control system for the starting and running-down of a power take-off shaft on an agricultural vehicle, in particular a tractor, for which normal operation and management operation modes are to be provided, which achieves a rapid and smooth engagement of an hydraulically actuated clutch located between the engine and the power take-off shaft, of such a kind that on the one hand the hydraulically actuated clutch and the other hand the drive elements connected to it and on the other hand also tools differing markedly in behaviour at the moment of starting attain a maximum service life under all conditions of use. In addition, it should in both normal operation and also in management operation protect the cardan shaft from destruction through too great an angle of flexion. Finally in the management operation mode it should prevent the occurrence of lost time for every tool through too late engagement, which would reduce the effective deployment time, and which should render stalling of the engine impossible, in the case where the tool is already in ground contact before the PTO shaft starts turning.

Through inclusion of the temperature and the viscosity respectively of the hydraulic fluid in the controller for engagement and disengagement of the PTO shaft, it is ensured that the hydraulically actuated clutch engages and disengages optimally also when taking account of the markedly varying flow behaviour of the hydraulic fluid.

Also the use of at least one variable control adjustable by the operator for changing the time for engagement and disengagement is useful when deploying various very different tools, since with it for each tool a smooth engagement and disengagement can be realised.

Likewise the situation with the facility for the variable setting of the position of the lift, at which the hydraulically actuated clutch actually is to engage or disengage, since different tools because of their different shape and function, also in differently lowered positions must have regained their full speed and in particular raised positions only on grounds of safety on no account must they turn. At the same time the operator, only by turning the variable adjustable controller, must select the angular value of the lift, at which the solenoid valve should activate the hydraulically actuated clutch. Attainment of the desired angular value is signalled from the lift position sensor.

A further very important feature of the invention is the so-called learning curves stored in a ROM for an optimal engagement and disengagement of the hydraulically actuated clutch for all conceivable conditions of use, for different tools and changing machine-specific values in the time-span for engagement and disengagement, which embody a function of the quantity of hydraulic fluid flowing to the hydraulically actuated clutch in a unit of time. How great the correct quantity at each moment of the engagement and disengagement must be, is calculated by the processor in accordance with the input signals in the controller. In the learning curves always the last engagement and disengagement processes are stored and are called upon again for subsequent processes of that type, in which the subsequent engagements and disengagement are ever more improved. For this reason this control system is to be described as self-learning.

With this it is ensured that the fresh engagement and disengagement processes approach ever closer to the ideal case, which is seen in an ever-smoother engagement and disengagement in the shortest possible time. By smooth engagement is to be understood concretely, that engagement occurs in the shortest time, but in which the set engine speed is maintained undiminished. Furthermore the controller is in a position with the use of different tools, by evaluation of the input signals to recognise what known load is concerned, and it then selects from the previously stored learning curves the correct one for renewed engagement and disengagement. The controller reacts analogously to various conditions of deployment and changing machine-specific values.

In an expedient arrangement of the invention in accordance with subclaim 2, through comparison of the speeds of the PTO shaft and the engine taking account of the gear ratio selected on the gearbox arranged after the engine, it can be determined whether the speed of the PTO shaft has also actually attained the preselected value, which represents an additional safety aspect. Which gear ratio has just been selected, is established from a gear ratio sensor that reacts to the position of the gear-change lever.

To improve the running-down of the tool including the drive elements connected with it during disengagement, especially for a rapid running-down of the tool in the elevated position in management operation mode, it has proved its worth according to the features in subclaim 3, to arrange a proportionally controlled brake on the output shaft of the hydraulically actuated clutch. With such a brake a controlled running-down can be realised, which can proceed more smoothly or more abruptly as desired. In a preferred implementation, the brake is applied when the hydraulically actuated clutch is disengaged, in order to prevent an undesired starting of the PTO shaft, especially in the presence of high viscosity in the hydraulic fluid. To create more safety, the brake can also in normal operation be employed in conjunction with the OFF-switch for the hydraulically actuated clutch. It is important in both cases that the brake is controllable directly, completely independently of the solenoid valve of the controller.

According to the features of subclaims 4 and 5 reference must be made to the particular suitability of the proportional valve or a pulse driven ON/OFF valve as a solenoid valve in control of the starting and running-down of the PTO shaft in accordance with the invention.

To initiate the engagement and disengagement process of the hydraulically actuated clutch, according to the features of subclaims 6 and 7, conventional switches as ON and OFF switches present themselves for this.

As in the management mode of operation lowering of the lift goes very rapidly and the tool already before ground contact must transmit a torque, according to the features of subclaims 8 and 9 it has proved to be expedient, for normal operation mode and management operation mode to provide a separate variably adjustable controller for changing the quantity of hydraulic fluid and with it the time for engagement or disengagement respectively of the hydraulically actuated clutch, in order to be able better to adapt to these differing conditions.

In a preferred arrangement of the invention in accordance with subclaim 10, it is recommended that the controller be connected to a mode switch for selection between normal operation and management operation modes.

According to the features of subclaims 11 to 13, an advantage is to be seen if the instantaneous engine speed, the PTO shaft speed and the PTO shaft torque are fed as input signals via sensors to the control equipment, as fluctuations in these values necessitate other starting and running-down procedures.

For the sake of better clarity for the operator, according to subclaim 14 arranging control displays in the operating and control unit of the tractor has proved its worth. Moreover at least one clutch lamp should be included which signals the engaged state of the hydraulically actuated clutch. In addition a management lamp, which by lighting up indicates the activity of management operation is recommended.

If some day the aforementioned learning curves should for whatever reason be erased from the ROM of the controller, according to the features in subclaim 15 an advantageous solution can be seen in storing additionally so-called default curves there, which can be fallen back upon. The same applies also, if for example when changing the tool the changed instantaneous acceleration values on the hydraulically actuated clutch resulting from this deviate too far from the existing learned starting curves.

Finally, according to the features of subclaims 16 and 17 it is to be recommended for the signal processing of the switch, controller, sensors and actuators, that either a CAN-bus system or a Time-Trigger-Protocol (TTP) be employed with the same success.

In conclusion, an expedient arrangement of the control system according to the features in subclaim 18 is seen in fixing a job computer to each tool, in which the type of the tool is stored and is connected to the controller via its own tool BUS. Through the possible identification of the tool in question at once the first starting of the PTO shaft is correct.

Finally, as a precaution it should be pointed out that the scope of protection of the invention is not restricted to a PTO shaft arranged on the rear of an agricultural vehicle, but that all other arrangements are likewise included.

These and other objects, features and advantages are accomplished according to the instant invention by providing a control system is utilized for the starting and running-down of a PTO shaft on an agricultural vehicle, such as a tractor. The hydraulically actuated clutch, as well as the other parts and sub-assemblies connected with the clutch as part of the drive, attain a maximum service life under all conditions of use. The control system, both in normal operating mode and also in management operating mode, protects the cardan shaft against destruction through too great an angle of flexion. Finally, in the management mode of operation, the control system prevents the occurrence of a loss of time, which would reduce the effective time of use of the tractor with the tool in question, and renders impossible a stalling of the engine when starting the PTO shaft through too early ground contact of the tool, in which the PTO shaft is not yet turning.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
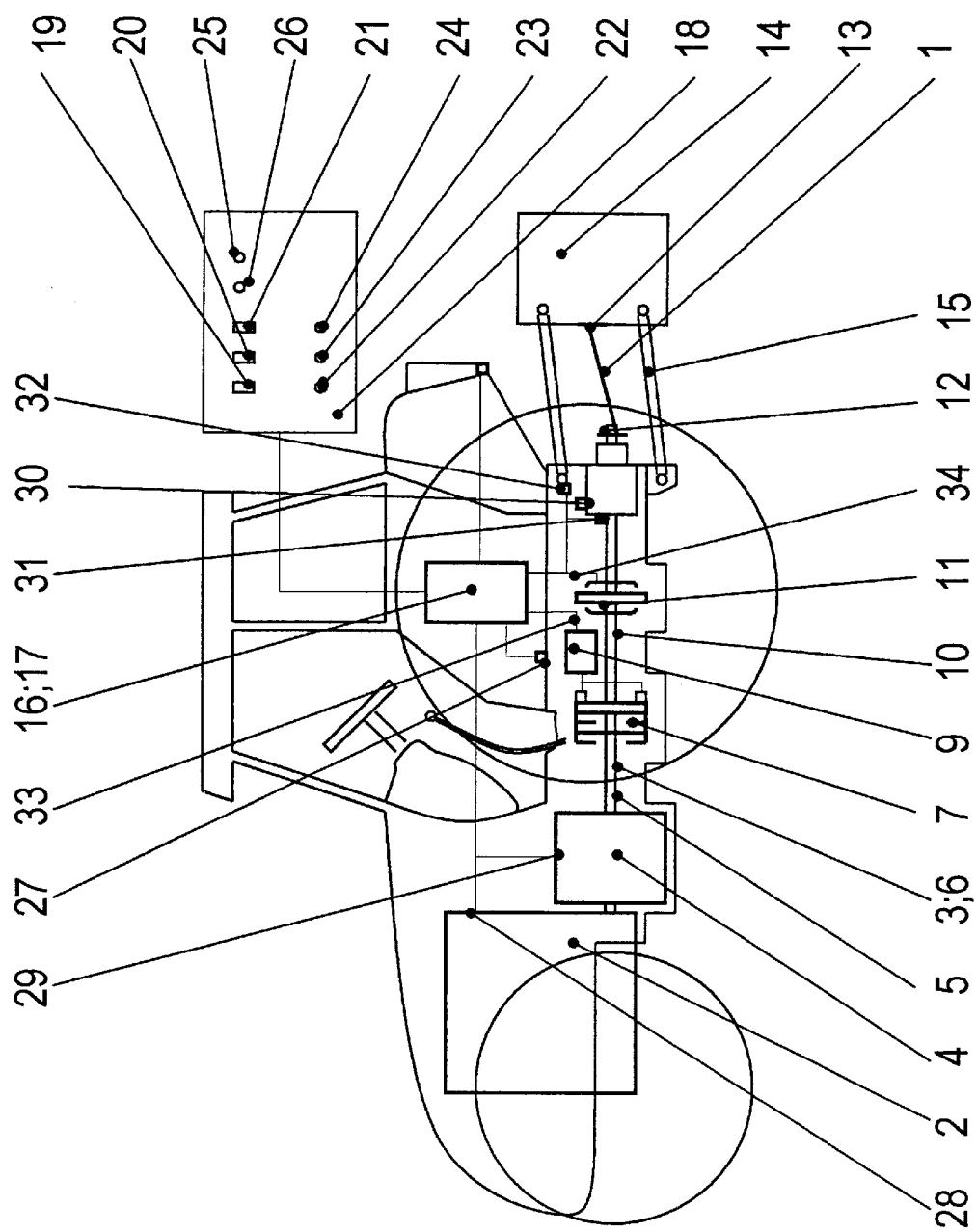
FIG. 1 is a schematic side view of a tractor with all the components for controlling the starting and running-down of a PTO shaft.
Figure 2:
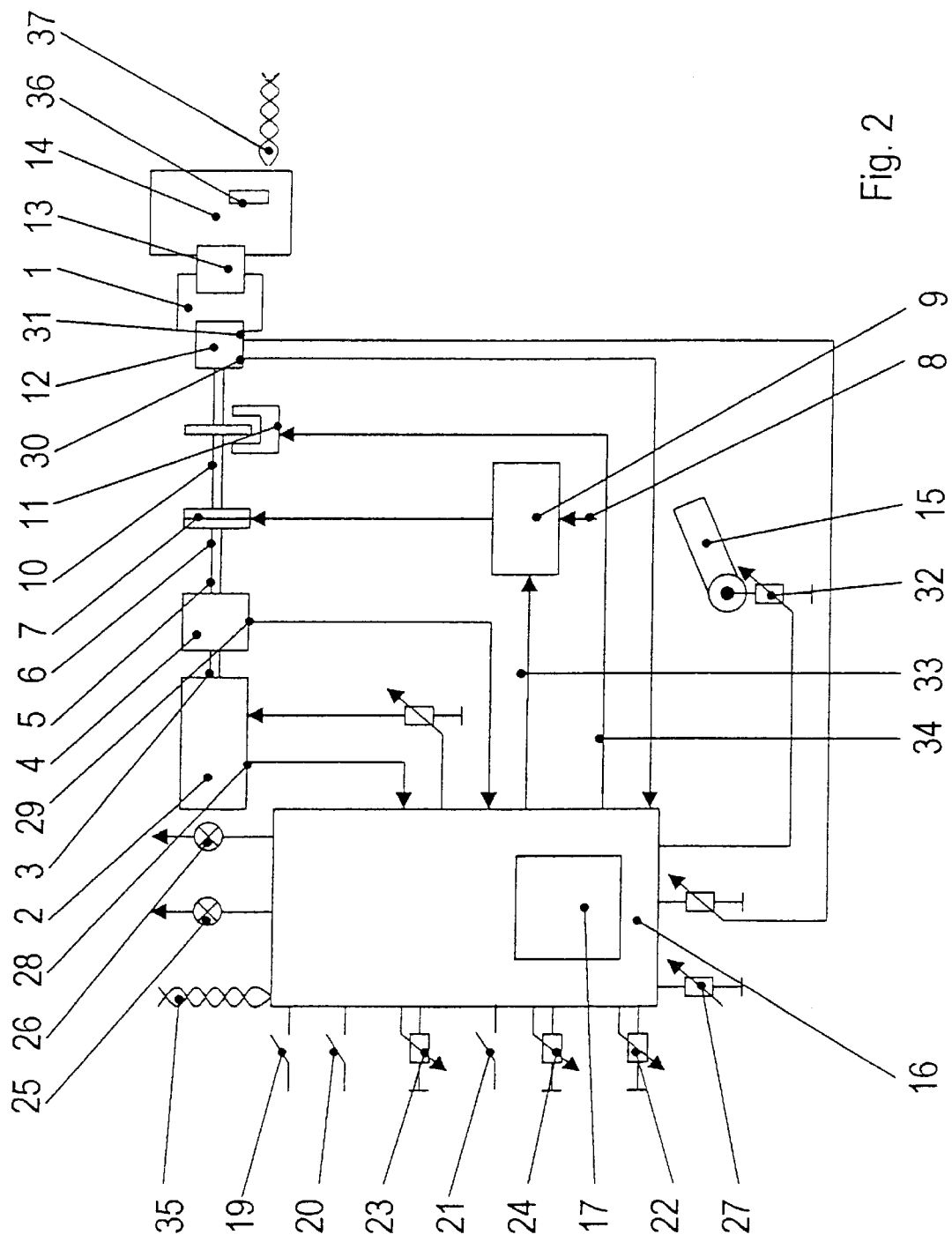
FIG. 2 is an electrical/hydraulic circuit diagram of the control system from FIG. 1.

FIG. 1 shows a side view, seen from the left side viewed from the direction of the tractor's travel, of the drive train for driving the cardan shaft 1, which emerges from the engine 2 and is connected via a shaft 3 to a gearbox 4. In the case of this gearbox 4 it concerns a spur pinion gearbox for producing the speeds of 540, 750, 1000 or 1400 r.p.m. usual in practice, which are passed on from its drive shaft 5 to the input shaft 6 of a hydraulically actuated clutch 7. Pressure from the hydraulic circuit 8 of the tractor is admitted to the hydraulically actuated clutch 7 by means of a solenoid valve 9. The drive train continues through the output shaft 10 of the hydraulically actuated clutch 7, on which a proportionally controlled brake 11 of any desired type is arranged, up to the PTO shaft 12 of the tractor. At one end the PTO shaft 12 the cardan shaft 1 is fixed, which with its other end is connected to the PTO shaft 13 of the tool 14 so as to drive it, which is attached to the lift 15 of the tractor.

For controlling the starting and running-down of the PTO shaft 12 an important component is a controller 16, in which is installed a processor 17 for processing a multitude of input signals and for passing on output signals. One part of the input signals comes from the control and display unit 18 located in the driver's cab of the tractor, which includes an ON switch 19 for engaging and an OFF switch 20 for disengaging the hydraulically actuated clutch 7. In addition there is a mode switch 21, a variably adjustable control 22 for the normal operating mode and a variably adjustable control 23 for the management mode of operation for varying the quantity of hydraulic fluid passed through and hence varying the time for engagement and disengagement of the hydraulically actuated clutch 7, as well as at least one further variably adjustable control 24 for determining the position of the lift 15, at which the hydraulically actuated clutch 7 should automatically engage or disengage respectively. Finally, on the control and display unit 18 there should be a clutch lamp 25 and a management lamp 26 as control indicators.

The controller 16 receives further input signals from where they arise, for which a sensor 27 for measuring the viscosity and temperature of the hydraulic fluid, an engine speed sensor 28, a gear ratio sensor 29 on the gearbox 4, a PTO shaft speed sensor 30, a PTO shaft torque sensor 31 and a lift position sensor 32 are included.

The controller 16 emits output signals to the solenoid valve 9 via a signal line 33 and to the brake 11 via the control line 34. For evaluating signals from the switch, controller, sensors and actuators a CAN-bus system 35 is employed.

On the tool 14 a job computer 36 is installed, in which the relevant type of the tool 14 is stored and which is connected to the controller via its tool bus 37.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a control system for starting and running-down a power-take-off shaft on an agricultural vehicle or tractor, including a hydraulically actuated clutch, which is located in the drive train on a shaft between the engine and the power-take-off shaft of the tractor; a solenoid valve which is fed with pressure from the hydraulic circuit of the tractor, which is connected to the hydraulically actuated clutch; and a controller with processor, which is connected via a signal line to the solenoid valve, for the transmission of output signals and is connected with switches controllers and sensors for picking up input signals, the improvement comprising:

one of the sensors is the sensor for measuring the viscosity and temperature of the hydraulic fluid;

at least one variably adjustable control is present for altering the quantity of hydraulic fluid and with it altering the time for engagement and disengagement of the hydraulically actuated clutch;

a further sensor is the lift position sensor for determining the current position of a lift, which is connected with at least one further variably adjustable sensor for determining the positions of the lift, at which the hydraulically actuated clutch should automatically respectively engage or disengage; and in the controller are stored constantly improving learning curves for various tools, conditions of use and machine-specific values, with which the controller by evaluation of the input signals passed to it selects the optimum learning curves for a renewed engagement and disengagement.

2. The control system of claim 1 wherein a gearbox is arranged between the engine and an input shaft of the hydraulically actuated clutch, a gear ratio sensor of which is connected with the controller.

3. The control system of claim 2 wherein a proportionally controlled brake is associated with an output shaft of the hydraulically actuated clutch connected with the PTO shaft of the tractor, said brake being connected to the controller by means of a control line.

4. The control system of claim 1 wherein the solenoid valve is a proportional valve.

5. The control system of claim 1 wherein the solenoid valve is connected to an ON/OFF switch driven by timed pulses.

6. The control system of claim 1 wherein the controller is connected to an ON-switch for engaging the hydraulically actuated clutch.

7. The control system of claim 1 wherein the controller is connected to an OFF-switch for disengaging the hydraulically actuated clutch.

8. The control system of claim 1 wherein the controller is connected with a variably adjustable control for altering the quantity of hydraulic fluid and with that for altering the time for engagement and disengagement of the hydraulically actuated clutch in the normal mode of operation.

9. The control system of claim 1 wherein the controller is connected with a variably adjustable control for altering the quantity of hydraulic fluid and with that for altering the time for engagement and disengagement of the hydraulically actuated clutch in the management mode of operation.

10. The control system of claim 9 wherein the controller is connected with a mode switch for selecting between normal operation and management operation.

11. The control system of claim 10 wherein the controller is connected with an engine speed sensor.

12. The control system of claim 11 wherein the controller is connected with a PTO shaft speed sensor.

13. The control system of claim 12 wherein the controller is connected with a PTO shaft torque sensor.

14. The control system of claim 13 wherein the operating and display unit of the tractor several optical or acoustic control indicators, for example a clutch lamp and/or a management lamp are located.

15. The control system of claim 14 wherein a ROM of the controller preset default curves as a function of the quantity of hydraulic fluid passed into the hydraulically actuated clutch per unit of time are stored.

16. The control system of claim 15 wherein a CAN-bus system is employed for signal processing of the switch, controller, sensors and actuators.

17. The control system of claim 16 wherein a Time-Trigger-Protocol TTP is employed for signal processing of the switch, controller, sensors and actuators.

18. The control system of claim 17 wherein a job computer is installed on the tool, in which is stored the type of tool in question, said job computer being connected to the controller with its tool bus in the LBS-implementation.

* * * * *